United States Patent [19]

Oughstun

[11] 4,399,543
[45] Aug. 16, 1983

[54] LINEAR OUTPUT COUPLER FOR A HIGH POWER OPTICAL RING RESONATOR

[75] Inventor: Kurt E. Oughstun, Marlborough, Conn.

[73] Assignee: United Technologies Corporation, Hartford, Conn.

[21] Appl. No.: 239,307

[22] Filed: Mar. 2, 1981

[51] Int. Cl.³ .............................................. H01S 3/05
[52] U.S. Cl. ...................................... 372/95; 372/94; 356/350
[58] Field of Search .......................... 372/95, 94, 108; 356/350

[56] References Cited

U.S. PATENT DOCUMENTS 3,824,487  7/1974  Buczek et al. ......................... 372/95
4,164,366  9/1979  Sziklas et al. ......................... 372/95

Primary Examiner—William L. Sikes
Assistant Examiner—Leon Scott, Jr.
Attorney, Agent, or Firm—Eric W. Petraske

[57] ABSTRACT

An output coupler for a high power ring laser employs a wedge mirror and a corresponding inverted wedge mirror to deflect a portion of both forward and reverse traveling waves and to combine the out-coupled radiation into a single output beam.

4 Claims, 2 Drawing Figures

LINEAR OUTPUT COUPLER FOR A HIGH POWER OPTICAL RING RESONATOR

DESCRIPTION

TECHNICAL FIELD

The technical field of the invention is that of an output coupling device for a high energy laser having a ring resonator configuration and carrying circulating power in both forward and reverse modes.

BACKGROUND ART

U.S. Pat. No. 3,824,487, issued on July 16, 1974 to C. J. Buczek et al, illustrates a variety of unstable ring resonator designs for high power lasers. These ring resonator designs employ mirrors rather than lenses in order to magnify and demagnify the circulating beam because of the high circulating powers involved. Various methods of enhancing the forward circulating beam power and suppressing the reverse circulating beam power are also disclosed in this patent. Suppression of the reverse mode is sought because both the forward and the reverse modes compete for the available gain power and hitherto it has not been possible in unstable ring resonators to employ the power contained in the reverse mode. Conventional means of coupling power out of a standard unstable ring resonator include the utilization of a scraper mirror in which the output power is reflected from the outer annular ring of the mirror and also the use of diffractive coupling around the edge of a small mirror. U.S. Pat. No. 3,500,240, issued on Mar. 10, 1970 to B. V. Kessler, illustrates the use of a coupling device for a stable ring resonator in which an output coupling device permits the unimpeded passage of a forward mode and reflects a reverse mode back into the gain medium parallel to and traveling the same direction as the forward mode.

DISCLOSURE OF INVENTION

The invention relates to a linear coupling device for an unstable ring resonator, having both forward and reverse traveling modes within the optical cavity, that couples out both the forward and reverse modes along a common direction parallel to one another. Variations of the invention include a method of coupling radiation into such an unstable cavity and also controlling a pulsed output simultaneously with a CW continuous output.

BEST MODE FOR CARRYING OUT THE INVENTION

Figure 1:
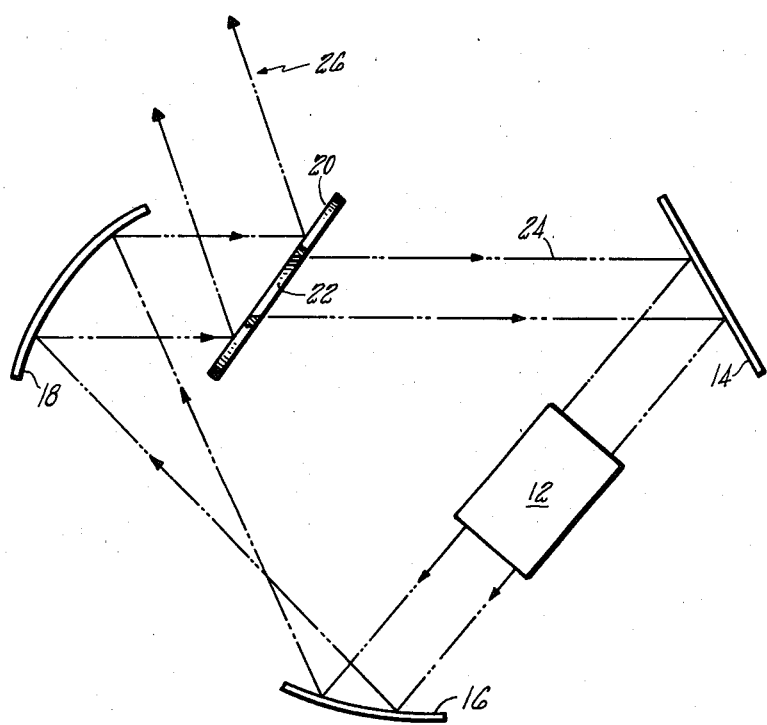
FIG. 1 illustrates schematically a conventional unstable resonator according to the prior art.
Figure 2:
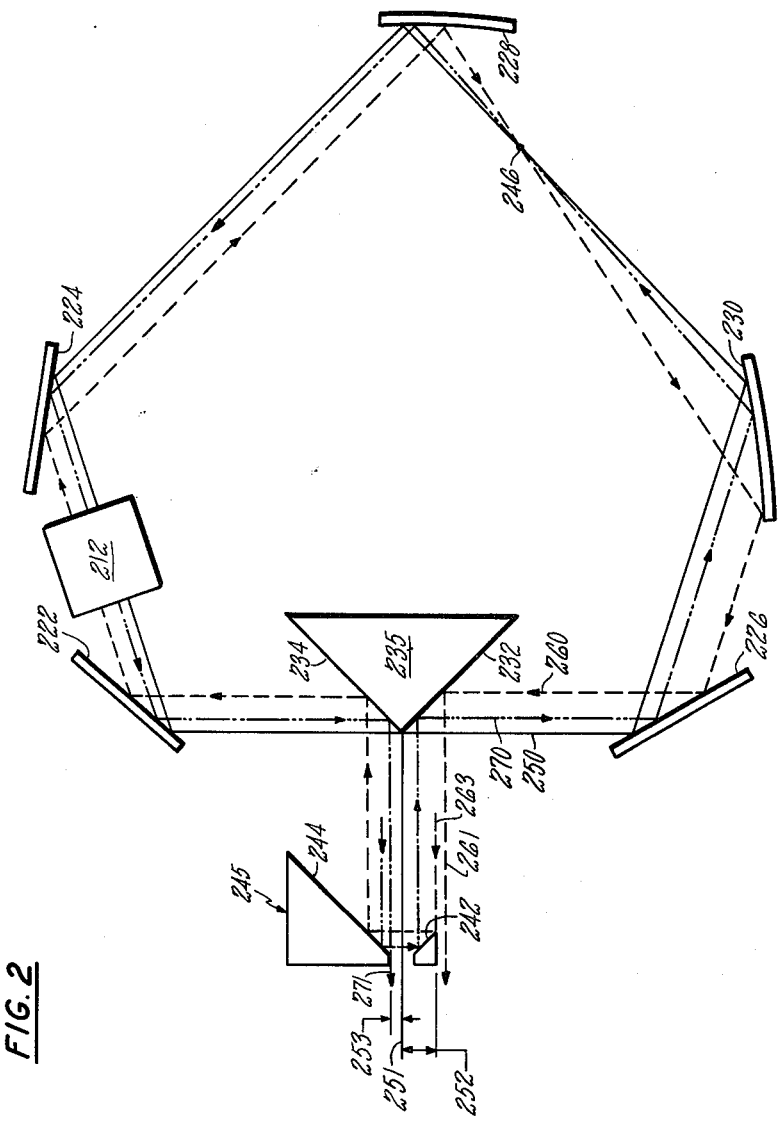
FIG. 2 illustrates schematically an embodiment of the invention.

In FIG. 2, gain medium 212 pumped by conventional pumping means not shown generates optical radiation in both a forward and reverse mode. This radiation is reflected about a ring resonator cavity defined by a set of plane and curved mirrors. In sequence, plane mirror 224 reflects radiation onto cylindrical mirror 228 which focuses it at point 246 and then passes it to cylindrical mirror 230 which in turn reflects the radiation to plane mirror 226, into an output coupling device formed by wedge mirror 235 and inverted wedge mirror 245, then to plane mirror 222 and back through gain medium 212. Three paths traversing this mirror system are illustrated in the figure; the optic axis 250, indicated by a solid line; the path of the forward mode 260, indicated by a dotted line and the path of the reverse mode 270, indicated by a phantom line. The forward mode is magnified by a factor M given by the ratio of the focal lengths of mirrors 230 and 228, and the reverse mode is demagnified by the inverse of that factor M, thus the forward mode becomes spatially larger as it traverses the ring system and the reverse mode is demagnified. The ring mirror configuration is similar to a prior art device illustrated in FIG. 1 in which gain mirror medium 12 generates radiation traversing a mirror system indicated by cylindrical mirror 16, cylindrical mirror 18, scraper mirror 20 and plane mirror 14. Scraper mirror 20 contains an aperture 22 which permits the passage of the central portion of the circulating radiation for subsequent passes around the system and an annular device which reflects radiation out from the system along path 26. This output coupling device is circularly symmetric and reflects out of the laser cavity only the outer portion of the circulating radiation. In contrast, the output coupling device of the subject invention, formed by wedge mirror 235 and inverted wedge mirror 245, is an off-axis device which deflects radiation from only one side of the optic axis.

Radiation in the forward mode traveling along path 260 strikes face 232 of wedge mirror 235 and is reflected at right angles from optic axis 250 along path 261 indicated in FIG. 2. As it travels along path 261, it passes surface 242 of inverted wedge mirror 245 spaced a distance 252 from the optic axis extension 251. That portion of the forward mode which is at a distance from the optic axis extension 251 greater than distance 252 will pass unobstructed out of the cavity and that portion of the forward mode that is a distance less than distance 252 from optic axis extension 251 will be reflected transversely off faces 242, 244, and 234 and then around the resonator system again. The fraction of the power in the forward mode that is reflected out of the cavity depends on the magnification of the radiation as it circulates around the cavity and on the distance 252 from the optic axis. It is evident from the figure that the outcoupling of the forward mode is not symmetric about the optic axis but rather is one sided in that only radiation entering on one side of the optic axis is coupled out. This off-axis configuration results in a transverse cavity mode which is relatively insensitive to cavity perturbations compared with modes that are symmetric about an optic axis.

For a reverse mode, indicated by a phantom line 270 in FIG. 2, the radiation is reflected off face 234 of mirror 235, then reflected again off face 244 of mirror 245, retroreflected back towards the ring resonator configuration by mirror face 242, and back parallel to the optic axis by face 232. Only that portion of the reverse mode that is a distance from the optic axis extension 251 less than the distance 253 from optic axis extension 251 to the edge of mirror 244 will be coupled out of the cavity. This outcoupled reverse mode radiation will travel along a path 271 which is parallel to path 261 taken by the outcoupled forward mode radiation. The simultaneous parallel outcoupling of forward and reverse mode radiation is in contrast to that of the Kessler patent '240, in which only the forward mode is outcoupled directly while the reverse mode is reflected back through the gain medium again. That portion of the reverse mode radiation which is a distance greater than distance 253 from optic axis extension 251 will be coupled back into the ring resonator and continue around the circuit again. The fraction of reverse mode radiation which is coupled back is controlled by the magnification ratio of mirrors 228 and 230 and by the size of the aperture, governed by distance 253. The magnification ratio is common to the outcoupling fraction of both the forward and reverse modes, but the separate distances 252 and 253 permit a great deal of flexibility in handling the radiation within the cavity.

It may be desired to combine the outcoupled radiation traveling along paths 261 and 271 to form a total output beam by conventional optical means. Alternatively, it may be desired to increase the outcoupled fraction of the reverse mode power to an amount such that the reverse mode is below threshold, thereby effectively suppressing the reverse mode radiation within the cavity. If the illustrated unstable ring resonator is to be used in a master oscillator power amplifier configuration, it may be desired to inject the master oscillator beam through the aperture governed by slit 253, which provides a convenient input port. Alternatively, since the reverse mode beam is stable, it may be desirable to use the reverse mode beam as the injection signal by retroreflecting it back into the cavity.

The invention may also be used to provide variable output coupling. For example, wedge prism 235 may be moved along a direction perpendicular to axis 250 by a small amount controlled by active cavity considerations or at a fixed frequency, in which case, the forward mode would be essentially unaffected but the reverse mode would be alternately coupled out through slit 253, or permitted to traverse the ring cavity essentially undisturbed. As a result, the reverse mode would build up power while it was undisturbed, and then would be switched out in a relatively short time.

In the case when the gain medium provides single wavelength gain, the forward and reverse waves compete for the energy stored in the gain medium. In that case, the reverse wave outcoupling aperture may be made of a great enough size so the reverse wave operation is effectively suppressed, thereby concentrating the stored power in the forward mode. For multiwavelength operation, the forward and reverse wave fields are allowed to run at different wavelengths according to the gain profiles to which they most efficiently couple. Since the forward wave mode is magnified and has a suitably large mode volume across the gain medium, it will in general have a different mode profile in the gain region from that of the reverse wave. Thus, in operation, the forward and reverse waves will extract energy from different portions of the gain medium and from different lines of the gain medium.

I claim:

1. An unstable optical resonator comprising:
a gain medium with pumping means therefor;
a mirror means for directing optical radiation in forward and reverse traveling modes along a ring path traversing said gain medium, said ring path including an optic axis;
first mirror means for coupling radiation including a wedge mirror having an opening angle of substantially 90° and forward and reverse faces oriented 45° with respect to said optic axis and disposed on one side of said axis, said forward and reverse faces being oriented to couple radiation in said forward and reverse modes along forward and reverse coupling paths at right angles to said optic axis, whereby coupled radiation in said forward and reverse modes is coupled out of said ring path;
second mirror means for coupling radiation including an inverted wedge mirror having a first face parallel to said forward face and a second face parallel to said reverse face, said first and second faces being of predetermined size and disposed at predetermined positions along said forward and reverse coupling paths such that predetermined fractions of said coupled radiation are deflected from said coupling paths and reflected back toward said wedge mirror and about said ring path.

2. An optical resonator according to claim 1, including first and second mirror means for coupling radiation, in which said second face of said inverted wedge mirror is disposed at a predetermined output distance from an axis intermediate said forward and reverse face and at right angles with respect to said optic axis and said output distance is such that said predetermined fraction of said reverse mode coupled radiation maintains said reverse mode radiation below a predetermined threshold.

3. An optical resonator according to claim 1, further including means for combining said forward and reverse mode coupled radiation to form an output beam of optical radiation.

4. An optical resonator according to claim 1, further including means for returning a portion of said reverse mode outcoupled radiation, in which said size and disposition of said second face and said predetermined fraction of said reverse mode outcoupled radiation are such that said predetermined fraction of said reverse mode outcoupled radiation is retroreflected into said ring path into said forward mode, whereby said forward mode is controlled by said retroreflected predetermined fraction of said reverse mode outcoupled radiation.

* * * * *